United States Patent
Han et al.

(10) Patent No.: US 8,377,610 B2
(45) Date of Patent: Feb. 19, 2013

(54) MEMBRANE-ELECTRODE ASSEMBLY FOR A FUEL CELL AND A FUEL CELL SYSTEM INCLUDING THE SAME

(75) Inventors: Sang-Il Han, Suwon-si (KR); In-Hyuk Son, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1074 days.

(21) Appl. No.: 11/723,524

(22) Filed: Mar. 20, 2007

(65) Prior Publication Data

US 2007/0218342 A1 Sep. 20, 2007

(30) Foreign Application Priority Data

Mar. 20, 2006 (KR) .......................... 10-2006-025244

(51) Int. Cl.
*H01M 4/02* (2006.01)
(52) U.S. Cl. ........ 429/523; 429/524; 429/525; 429/526; 429/527
(58) Field of Classification Search .......... 429/523–527; 502/101
See application file for complete search history.

(56) References Cited

U.S. PATENT DOCUMENTS

| | | | |
|---|---|---|---|
| 3,346,421 A | 10/1967 | Thompson et al. | |
| 3,357,863 A | 12/1967 | Ziering et al. | |
| 3,977,901 A | 8/1976 | Buzzelli | |
| 4,444,852 A | 4/1984 | Liu et al. | |
| 5,318,862 A | 6/1994 | Liu et al. | |
| 5,821,185 A | 10/1998 | White et al. | |
| 6,040,077 A | 3/2000 | Debe et al. | |
| 6,183,898 B1 | 2/2001 | Koschany et al. | |
| 6,749,959 B2 | 6/2004 | Kaji et al. | |
| 6,880,238 B1 | 4/2005 | Kumar et al. | |
| 7,001,581 B2 | 2/2006 | Kawakami et al. | |
| 7,056,455 B2 * | 6/2006 | Matyjaszewski et al. | ... 264/29.2 |
| 2002/0015875 A1 | 2/2002 | Kim | |
| 2002/0068213 A1 * | 6/2002 | Kaiser et al. | ..................... 429/40 |
| 2003/0031916 A1 * | 2/2003 | Haridoss et al. | ................ 429/40 |
| 2003/0183080 A1 | 10/2003 | Mundschau | |
| 2004/0038808 A1 | 2/2004 | Hampden-Smith et al. | |
| 2004/0058227 A1 * | 3/2004 | Tanaka et al. | .................... 429/44 |
| 2004/0086775 A1 | 5/2004 | Lloyd et al. | |
| 2004/0229108 A1 * | 11/2004 | Valdez et al. | .................... 429/40 |
| 2004/0247991 A1 * | 12/2004 | Suzuki et al. | ................... 429/44 |
| 2004/0265679 A1 * | 12/2004 | Yamamoto | ...................... 429/44 |
| 2005/0260484 A1 | 11/2005 | Mikhail et al. | |
| 2006/0188774 A1 | 8/2006 | Niu et al. | |

(Continued)

FOREIGN PATENT DOCUMENTS

KR 1020060001455 1/2006
WO WO/2004/091784 10/2004

OTHER PUBLICATIONS

Office Action (Paper No. 20100725) mailed on Aug. 6, 2010 for U.S. Appl. No. 11/640,212.

(Continued)

*Primary Examiner* — Carlos Barcena
(74) *Attorney, Agent, or Firm* — Robert E. Bushnell, Esq.

(57) ABSTRACT

A membrane-electrode assembly for a fuel cell includes an anode and a cathode facing each other and a polymer electrolyte membrane interposed therebetween. At least one of the anode and the cathode includes a conductive electrode substrate and a catalyst layer formed thereon, and the catalyst layer includes a first catalyst layer including a first metal catalyst that grows from the polymer electrolyte membrane toward the electrode substrate and a second catalyst layer including a second metal catalyst covering the first catalyst layer.

17 Claims, 3 Drawing Sheets

U.S. PATENT DOCUMENTS

| | | | |
|---|---|---|---|
| 2006/0211891 A1 | 9/2006 | Hirota et al. | |
| 2007/0231675 A1* | 10/2007 | Son | 429/44 |
| 2007/0243448 A1 | 10/2007 | Son | |
| 2007/0269699 A1* | 11/2007 | Pak et al. | 429/30 |

OTHER PUBLICATIONS

European Search Report dated Jul. 30, 2007, for EP 07 109536.8, in the name of Samsung SID Co., Ltd.

Office Action (Paper No. 20100729) mailed on Aug. 4, 2010 for U.S. Appl. No. 11/758,610.

Office Action (Paper No. 20100121) mailed on Feb. 4, 2010 for U.S. Appl. No. 11/758,610.

Ogawa et al. "Ti-Nano-nodular Structuring for Bone Integration and Regeneration." Journal of Dental Research. Aug. 2008 vol. 87 No. 8 751-756. http://jdr.sagepub.com/content/87/8/751.

* cited by examiner

MEMBRANE-ELECTRODE ASSEMBLY FOR A FUEL CELL AND A FUEL CELL SYSTEM INCLUDING THE SAME

CLAIM OF PRIORITY

This application makes reference to, incorporates the same herein, and claims all benefits accruing under 35 U.S.C.§119 from an application for MEMBRANE-ELECTRODE ASSEMBLY FOR FUEL CELL, METHOD OF PREPARING SAME AND FUEL CELL SYSTEM COMPRISING SAME earlier filed in the Korean Intellectual Property Office on 20 Mar. 2006 and there duly assigned Serial No. 10-2006-0025244.

BACKGROUND OF THE INVENTION (a) Field of the Invention

The present invention relates to a membrane-electrode assembly for a fuel cell, a method of manufacturing the same, and a fuel cell system including the same.

(b) Description of the Related Art

A fuel cell is a power generation system for producing electrical energy through an electrochemical redox reaction of an oxidant and hydrogen in a hydrocarbon-based material such as methanol, ethanol, or natural gas.

Such a fuel cell is a clean energy source that can replace fossil fuels. It includes a stack composed of unit cells, and produces various ranges of power output. Since it has four to ten times higher energy density than a small lithium battery, it has been high-lighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as fuel.

The polymer electrolyte membrane fuel cell has an advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte membrane fuel cell, but it has advantages of easy handling of fuel, being capable of operating at room temperature due to its low operation temperature, and no need for additional fuel reforming processors.

In the above fuel cell, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

Fuel is supplied to an anode and absorbed in a catalyst thereof, and the fuel is oxidized to produce protons and electrons. The electrons are transferred into a cathode via an external circuit, and the protons are transferred into the cathode through a polymer electrolyte membrane. An oxidant is supplied to the cathode, and the oxidant, protons, and electrons are reacted on a catalyst at the cathode to produce electricity along with water.

SUMMARY OF THE INVENTION

One embodiment of the present invention provides a membrane-electrode assembly that has an improved interaction between a polymer electrolyte membrane and a catalyst layer and mass transfer properties due to micropores.

Another embodiment of the present invention provides a method of manufacturing a membrane-electrode assembly.

Yet another embodiment of the present invention provides a fuel cell system that includes a membrane-electrode assembly.

According to one embodiment of the present invention, a membrane-electrode assembly for a fuel cell including a polymer electrolyte membrane; and a first electrode and a second electrode formed on both sides of the polymer electrolyte membrane and facing each other, at least one of the first electrode and the second electrode comprising: an electrode substrate; and a catalyst layer formed on the electrode substrate, the catalyst layer comprising a first catalyst layer including a first catalyst grown from the polymer electrolyte membrane toward the electrode substrate and a second catalyst layer including a second catalyst covering the first catalyst layer.

The first catalyst is grown in a shape selected from the group consisting of a nano-nodule, a micro-nodule, a nano-horn, a nanorod, a nanofiber, and combinations thereof. The first catalyst layer has an average height ranging from 50 nm to 5 mm from the polymer electrolyte membrane.

A thickness ratio of the first catalyst layer and the second catalyst layer ranges from $1/2500:1$ to $1/25:1$.

The first metal catalyst is selected from the group consisting of Pt, Ru, Au, W, Pd, Fe, and alloys thereof.

The second metal catalyst includes at least one selected from the group consisting of platinum, ruthenium, osmium, a platinum-ruthenium alloy, a platinum-osmium alloy, a platinum-palladium alloy, a platinum-M alloy, and combinations thereof, where M is transition elements selected from the group consisting of Ga, Ti, V, Cr, Mn, Fe, Co, Ni, Cu, Zn, Sn, Mo, W, Rh, Ru, and combinations thereof.

The catalyst layer may further include a support which is formed on the polymer electrolyte membrane and on which the first catalyst is grown, and the support is selected from the group consisting of Ce, Ni, Mn, Fe, Co, Zr, zirconia, polyoxometalate, heteropoly acid (HPA), and combinations thereof.

According to another embodiment of the present invention, a method of manufacturing a membrane-electrode assembly includes providing a polymer electrolyte membrane; forming a first electrode on one side of the polymer electrolyte membrane and a second electrode on the other side of the polymer electrolyte membrane, said at least one of the first electrode and the second electrode being formed by: growing a first catalyst on one side of the polymer electrolyte membrane toward an electrode substrate to form a first catalyst layer; and providing a second catalyst layer including a second catalyst and an electrode substrate to form the second catalyst layer interposed between the first catalyst layer and the electrode substrate.

The providing of the second catalyst layer and the electrode substrate may include forming the second catalyst layer on the first catalyst layer and mounting the electrode substrate on the second catalyst layer. Alternatively, the providing of the second catalyst layer and the electrode substrate may include forming the second catalyst layer on the electrode substrate and mounting the second catalyst layer formed on the electrode substrate on the first catalyst layer.

The first catalyst layer may be formed using a method selected from the group consisting of spraying, sputtering, physical vapor deposition (PVD), plasma enhanced chemical vapor deposition (PECVD), thermal chemical deposition, ion beam evaporation, vacuum thermal evaporation, laser ablation, thermal evaporation, electron beam evaporation, and combinations thereof.

The second catalyst layer may be formed using a method selected from the group consisting of spraying, transferring, screen printing, and combinations thereof.

According to yet another embodiment of the present invention, a fuel cell system including an electricity generating element includes the above membrane-electrode assembly and a separator positioned at each side of the membrane-electrode assembly, a fuel supplier that supplies the electricity generating element with fuel, and an oxidant supplier that supplies the electricity generating element with an oxidant, is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An exemplary embodiment of the present invention will hereinafter be described in detail with reference to the accompanying drawings.

A membrane-electrode assembly of a fuel cell is composed of a polymer electrolyte membrane, and an anode and a cathode arranged at each side of the polymer electrolyte membrane. The membrane-electrode assembly generates electricity through oxidation of fuel and reduction of an oxidant. The reaction of generating electricity at a membrane-electrode assembly actively occurs when the polymer electrolyte membrane has a large interaction with a catalyst layer. That is to say, the polymer electrolyte membrane should have excellent interface adhesion to an electrode and also a large contact area at the interface therewith.

Therefore, according to one embodiment of the present invention, a catalyst layer includes a catalyst grown on a polymer electrolyte membrane toward an electrode substrate, and thereby increases the interaction between the catalyst layer and the polymer electrolyte membrane. In addition, it includes micropores inside the catalyst layer, and thereby facilitates mass transfer toward the polymer electrolyte membrane, improving performance of a fuel cell.

In a membrane-electrode assembly according to one embodiment of the present invention, the catalyst layer includes a first catalyst layer including a first catalyst (e.g., a first metal catalyst) that grows from the polymer electrolyte membrane toward the electrode substrate and a second catalyst layer including a second catalyst (e.g., a second metal catalyst) covering the first catalyst layer.

Figure 1:
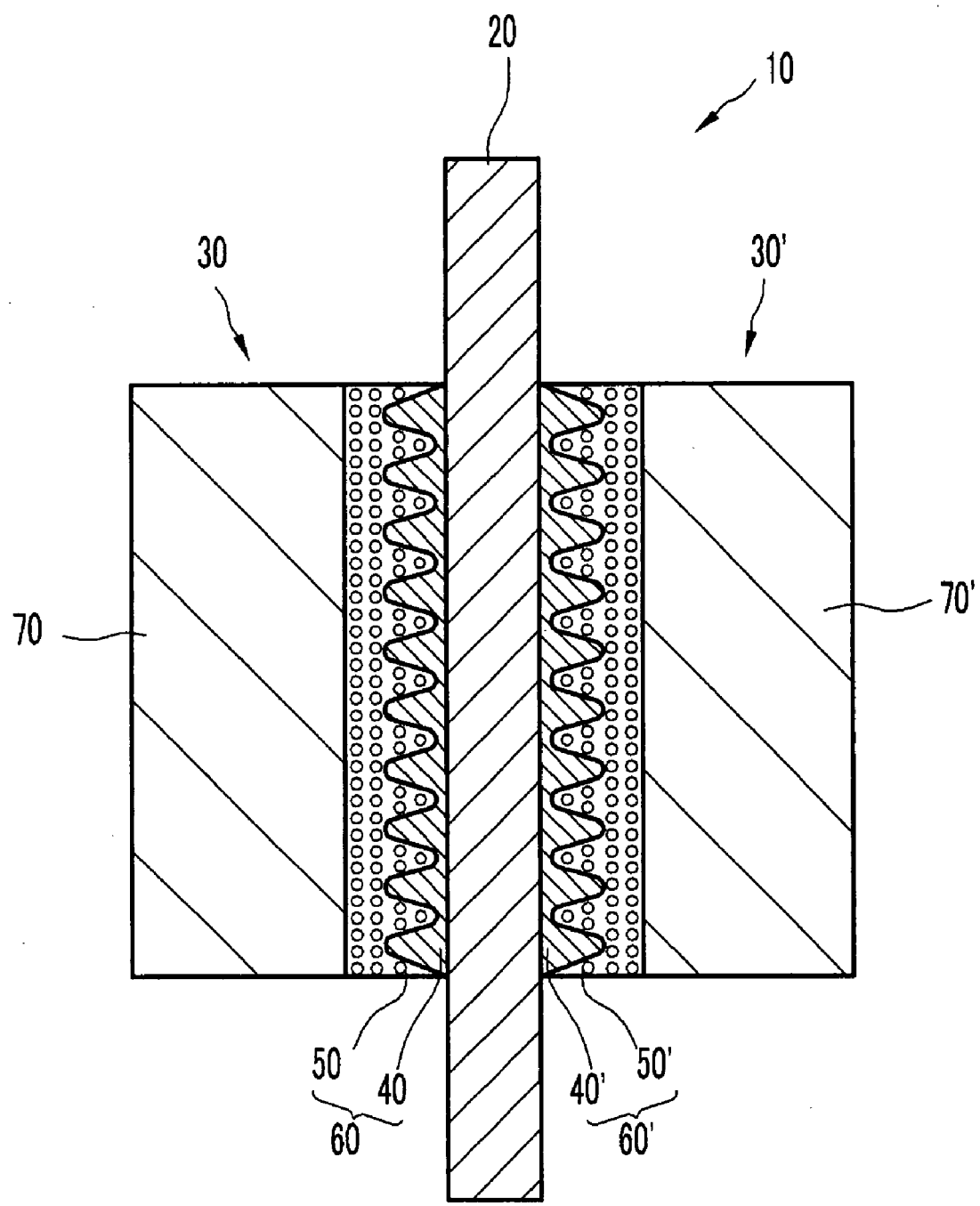
FIG. 1 is a schematic cross-sectional view showing a membrane-electrode assembly according to an embodiment of the present invention.

FIG. 1 is a schematic cross-sectional view showing a membrane-electrode assembly according to an embodiment of the present invention. As shown in FIG. 1, a catalyst layer with a double-layered structure is formed at both sides of an anode and a cathode, but a membrane-electrode assembly of the present invention is not limited thereto and a catalyst layer with a double-layered structure can be formed on only one side of an anode and a cathode.

Referring to FIG. 1, a membrane-electrode assembly 10 of an embodiment of the present invention includes a polymer electrolyte membrane 20 and electrodes 30 and 30' for a fuel cell disposed at both sides of the polymer electrolyte membrane 20. The electrodes 30 and 30' include electrode substrates 70 and 70' and catalyst layers 60 and 60' formed thereon.

In the membrane-electrode assembly 10, an electrode 30 disposed at one side of a polymer electrolyte membrane 20 is called an anode (or a cathode), when the other electrode 30' disposed at the other side of the polymer electrolyte membrane 20 is called a cathode (or an anode). Fuel passes an electrode substrate 70 and is transferred to a catalyst layer 60 in the anode 30, and generates hydrogen ions and electrons by an oxidation reaction of the fuel. The polymer electrolyte membrane 20 transfers the hydrogen ions generated from the anode 30 to the cathode 30'. The catalyst layer 60' catalyzes the reduction reaction of oxidant which passes an electrode substrate 70' and transferred to a catalyst 60', producing water with the hydrogen ions supplied from the catalyst layer 60 through the polymer electrolyte membrane 20.

The catalyst layers 60 and 60' catalyze oxidation of fuel and reduction of an oxidant, and include first catalyst layers 40 and 40' and second catalyst layers 50 and 50'.

The first catalyst layers 40 and 40' include a first metal catalyst grown toward electrode substrates 70 and 70' on a polymer electrolyte membrane 20.

More specifically, the first catalyst layer is formed by growing a first metal catalyst toward an electrode substrate on a polymer electrolyte membrane in a deposition method, a chemical adsorption method, or the like. In the above methods, a first metal catalyst directly grows in a shape such as nano-nodules, micro-nodules, nanohorns, nanorods, or nanofiber on a polymer electrolyte membrane by static electricity and interaction among metal particles, and thereby increases adhesion between the polymer electrolyte membrane and a catalyst layer, leading to facilitating mass transfer toward the polymer electrolyte membrane.

When the first metal catalyst grows in a shape such as nano-nodules, micro-nodules, nanohorns, nanorods, or nanofiber on a polymer electrolyte membrane, it may be in a range of a nano-size to a micro-size, and in particular at an average height ranging from 50 nm to 5 μm and preferably 200 nm to 2 μm. When the first metal catalyst has an average height of more than 5 μm, it may have a relatively small contact area with the second metal catalyst, having little effect. On the other hand, when it has an average height of less than 50 nm, it may have high density on the surface of a polymer electrolyte membrane so that the catalyst layer is too dense and flat.

The location where the first metal catalyst grows or its spacing can be regulated by a pattern or roughness on the surface of a polymer electrolyte membrane when it is disposed thereon. The first metal catalyst may be formed with a spacing of 1 nm to 1 mm, and preferably 10 to 500 nm, considering the case that the part of the second metal catalyst is positioned among the grown first metal catalyst. When the first metal catalyst grows with a spacing of less than 1 nm, the second metal catalyst cannot enter among the grown first metal catalyst, or the grown first metal catalyst may still have empty space among it, increasing membrane resistance. On the other hand, when of the spacing is more than 1 nm, the first metal catalyst may have a relatively small contact area with the second metal catalyst, having little catalyst effect.

In addition, the first metal catalyst can grow in a shape such as nano-nodules, micro-nodules, nanohorns, nanorods, or nanofiber, and thereby form micropores inside a catalyst layer. The micropores formed inside a catalyst layer can facilitate mass transfer toward a polymer electrolyte membrane.

The first metal catalyst may be selected from the group consisting of Pt, Ru, Au, W, Pd, Fe, and alloys thereof. According to one embodiment, Pt, W, Au, or alloys thereof may be suitable for the first metal catalyst. W and Au can advantageously provide a hydroxyl group, which is to be bound with Ru, and can thereby easily remove carbon monoxide bound with Pt, improving catalyst effects.

When forming a first catalyst layer including the first metal catalyst, a support with high ion conductivity may be first attached to a polymer electrolyte membrane to enhance an attachment rate of the first metal catalyst to the polymer electrolyte membrane and to grow it in a predetermined shape. Accordingly, the first catalyst layer may include a support with high ion conductivity as well as the first metal catalyst. The support may include at least one selected from the group consisting of a metal such as Ce, Ni, Mn, Fe, Co, Zr; zirconia; polyoxometalate (POM) such as polytungstate or polymolybdate; heteropoly acid (HPA), and combinations thereof. According to one embodiment, Ce is suitable.

On the first catalyst layers 40 and 40', the second catalyst layers 50 and 50' including a second metal catalyst are disposed to cover the first catalyst layer.

The second metal catalyst includes at least one selected from the group consisting of platinum, ruthenium, osmium, a platinum-ruthenium alloy, a platinum-osmium alloy, a platinum-palladium alloy, a platinum-M alloy, or combinations thereof, where M is transition elements selected from the group consisting of Ga, Ti, V, Cr, Mn, Fe, Co, Ni, Cu, Zn, Sn, Mo, W, Rh, Ru, and combinations thereof. As described above, even though the same catalyst may be used at an anode and a cathode, CO-tolerant platinum-ruthenium alloy catalysts may be suitably used as an anode catalyst in a direct oxidation fuel cell, since an anode catalyst may be poisoned by CO. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

In a catalyst layer including first and second catalyst layers according to an embodiment of the present invention, a first metal catalyst may be included therein in a weight ratio ranging from such a small amount so as to be in an error range to a weight ratio of 98:2 between the first and second metal catalysts. In terms of a thickness ratio, the catalyst layer may include the first and second catalyst layers in a thickness ratio ranging from $1/2500:1$ to $1/25:1$, and preferably from $1/650:1$ to $1/65:1$. When the thickness ratio is within the given range, the first and second catalysts may have increased contact areas, improving catalyst activity. However, when the thickness ratio is less than $1/2500$, the first metal catalyst may not grow well or not in a predetermined shape. On the other hand, when the thickness ratio is more than $1/25$, the first metal catalyst may be extremely dense and thereby just cover the surface of a polymer electrolyte membrane rather than grow in a predetermined shape.

Catalyst layers 60 and 60' with the above structure can be included in either one of an anode and a cathode. Since the first metal catalyst plays a role of increasing the number of hydroxyl groups in the bifunctional mechanism, it is advantageously included in an anode.

The electrode substrates 70 and 70' support the anode and the cathode, respectively, and provide a path for transferring fuel and an oxidant to the catalyst layer 60 and 60'.

As for the electrode substrates 70 and 70', a conductive substrate is used, for example carbon paper, carbon cloth, carbon felt, or a metal cloth (a porous film including a metal cloth fiber or a metallized polymer fiber), but is not limited thereto.

The electrode substrates 70 and 70' may be treated with a fluorine-based resin to be water-repellent to prevent deterioration of diffusion efficiency due to water generated during operation of a fuel cell. The fluorine-based resin may include polyvinylidene fluoride, polytetrafluoroethylene, fluorinated ethylene propylene, polychlorotrifluoroethylene, a fluoroethylene polymer, or combinations thereof.

A microporous layer (MPL, not shown) can be added between the aforementioned electrode substrates 70 and 70' and catalyst layers 60 and 60' to increase reactant diffusion effects. The microporous layer generally includes conductive powder materials, a binder, and an ionomer if required. The conductive power material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

In the membrane-electrode assembly according to one embodiment of the present invention, a polymer electrolyte a membrane is disposed between the anode and the cathode.

The polymer electrolyte membrane 20 plays a role of exchanging ions by transferring protons produced at an anode catalyst layer 60 to a cathode catalyst layer 60'. Therefore the polymer electrolyte membrane includes a proton conductive polymer that may be any polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

In addition, when the perfluorosulfonic acid (trade name: NAFION) is used for the polymer electrolyte membrane, X in an ion exchange group ($-SO_3X$) at a terminal end of a side chain may be replaced with a univalent ion such as sodium, potassium, and cesium, or tetrabutylammonium ion.

The substitution of an ion exchange group (—SO₃X) at the terminal end of the side chain in this way increases thermal stability of a fuel cell. Accordingly, even when a substrate is heat-treated at a high temperature of over 200° C. during a hot-pressing process for fabricating a membrane-electrode assembly, a polymer resin therein cannot be deteriorated, and thereby a lifespan of a fuel cell does not decrease. In addition, a polymer electrolyte membrane having an ion exchange group substituted with an ion such as sodium, potassium, cesium, tetrabutylammonium, or the like, for example a sodium-type polymer electrolyte membrane, is re-sulfonized when a catalyst layer is treated with a sulfonic acid later and thereby changes into a proton-type polymer electrolyte membrane.

In addition, the polymer electrolyte membrane may increase a contact area with a catalyst layer of an electrode, and thereby increase power. Further, it can have a surface roughness on one side or preferably both sides to facilitate a growth of metal catalyst in a predetermined shape.

A manufacturing of the membrane-electrode assembly with the above structure is shown hereinbelow with an exemplary method.

The method of manufacturing a membrane-electrode assembly includes providing a polymer electrolyte membrane; growing a first metal catalyst on a polymer electrolyte membrane toward an electrode substrate to form a first catalyst layer; forming a second metal catalyst layer covering the first catalyst layer; and mounting an electrode substrate on the second catalyst layer. Alternatively, a method of manufacturing a membrane-electrode assembly includes providing a polymer electrolyte membrane; growing a first metal catalyst on a polymer electrolyte membrane toward an electrode substrate to form a first catalyst layer; forming a second catalyst layer on a electrode substrate; and mounting the second catalyst layer on the electrode substrate on the first catalyst layer on the polymer electrolyte membrane.

More particularly, a polymer electrolyte membrane is prepared from a cation exchange resin with hydrogen ion conductivity.

The polymer electrolyte membrane has no particular limit to the method, but can be fabricated in a common method by using a cation exchange resin with hydrogen ion conductivity. The cation exchange resin with hydrogen ion conductivity may include the same as described above.

The polymer electrolyte membrane may have surface roughness that is formed by a plasma treatment on either or both surface thereof, etching treatment by using an acid solution, anodizing, corona treatment, rubbing, compression by using a plastic substrate with a predetermined pattern, sand papering, sand blasting, and combinations thereof.

In addition, before growing a first metal catalyst on the polymer electrolyte membrane, a support with high ion conductivity can be optionally attached thereto to increase an attachment rate of the first metal catalyst.

Herein, the support is the same as described above. The support may be attached using a method selected from the group consisting of sputtering, physical vapor deposition (PVD), plasma enhanced chemical vapor deposition (PECVD), thermal chemical deposition, ion beam evaporation, vacuum thermal evaporation, laser ablation, thermal evaporation, electron beam evaporation, and combinations thereof. According to one embodiment, sputtering may be suitable.

The support may be attached at a temperature ranging from 0 to 25° C. This temperature range can increase an attachment rate of a support and facilitate a first metal catalyst to easily grow in a predetermined shape.

Next, a first catalyst layer is formed by growing a first metal catalyst on a support attached to a polymer electrolyte membrane in a direction of an electrode substrate.

The first metal catalyst is the same as described above. The first catalyst layer may be formed using a method selected from the group consisting of spraying, sputtering, physical vapor deposition (PVD), plasma enhanced chemical vapor deposition (PECVD), thermal chemical deposition, ion beam evaporation, vacuum thermal evaporation, laser ablation, thermal evaporation, electron beam evaporation, and combinations thereof.

The above process may be performed at a temperature ranging from 0 to 25° C. When performed in the above range, a first metal catalyst can easily grow in a predetermined shape.

Therefore, the first metal catalyst may grow on a polymer electrolyte membrane or a support attached thereto in a direction of an electrode in a shape such as a nano-nodule, a micro-nodule, a nanohorn, a nanorod, a nanofiber, or the like.

Then, after a second catalyst layer including a second metal catalyst is formed to cover the first catalyst layer, an electrode substrate is united therewith, or after a second catalyst layer including a second metal catalyst is formed on an electrode substrate, they are united with a polymer electrolyte membrane including a first catalyst layer to form a membrane-electrode assembly.

The second metal catalyst is the same as described above. The second catalyst layer may be formed using a method selected from the group consisting of spraying, transferring, screen printing, and combinations thereof.

The electrode substrate is the same as described above. A method of uniting an electrode substrate with a polymer electrolyte membrane is well-known in this related field so it is not necessary to describe it in detail.

The membrane-electrode assembly may include a catalyst shaped as a nano-nodule, a micro-nodule, a nanohorn, a nanorod, or a nanofiber, and also a catalyst layer including micropores. Accordingly, the polymer electrolyte membrane in the membrane-electrode assembly may have increased interaction with the catalyst layer therein. In addition, mass transfer can be easily made through the polymer electrolyte membrane, improving cell characteristics.

According to an embodiment of the present invention, a fuel cell system including the above membrane-electrode assembly is provided.

The fuel cell system includes at least one electricity generating element including the membrane-electrode assembly and a separator, a fuel supplier for supplying the electricity generating element with fuel, and an oxidant supplier for supplying the electricity generating element with an oxidant.

The electricity generating element includes a membrane-electrode assembly and a separator (also referred to as a bipolar plate), and plays a role of generating electricity through oxidation of fuel and reduction of an oxidant.

The fuel supplier plays a role of supplying the electricity generating element with fuel including hydrogen, and the oxidant supplier plays a role of supplying the electricity generating element with an oxidant. The oxidant includes oxygen or air. The fuel includes liquid or gaseous hydrogen, or a hydrocarbon-based fuel such as methanol, ethanol, propanol, butanol, or natural gas.

Figure 2:
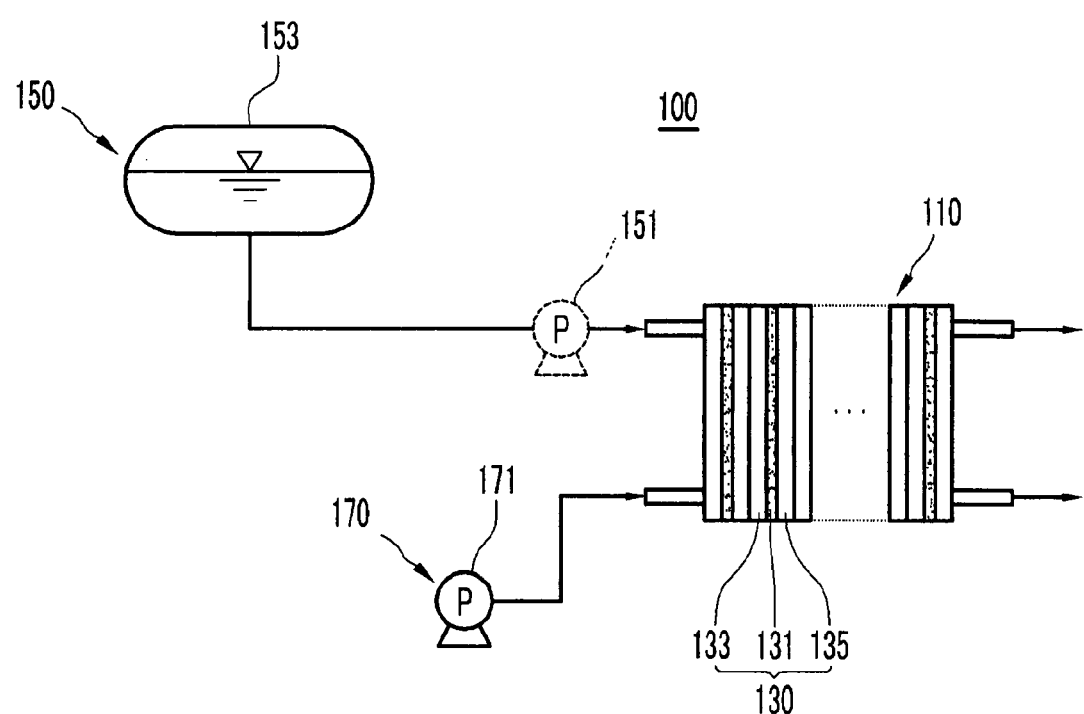
FIG. 2 is a schematic diagram showing the structure of a fuel cell system according to another embodiment of the present invention.

FIG. 2 shows a schematic structure of a fuel cell system 100 that will be described in detail with reference to this accompanying drawing, as follows. FIG. 2 illustrates a fuel cell system wherein fuel and an oxidant are provided to the electricity generating element 130 through pumps 124 and 132, but the present invention is not limited to such structures. The fuel cell system of the present invention alternatively includes a structure wherein fuel and an oxidant are provided in a diffusion manner.

A fuel cell system 100 includes at least one electricity generating element 115 that generates electrical energy through an electrochemical reaction of fuel and an oxidant, a fuel supplier 120 for supplying fuel to the electricity generating element 115, and an oxidant supplier 130 for supplying an oxidant to the electricity generating element 115.

In addition, the fuel supplier 120 is equipped with a tank 122 that stores fuel, and a pump 124 that is connected therewith. The fuel pump 124 supplies fuel stored in the tank 122 with a predetermined pumping power.

The oxidant supplier 130, which supplies the electricity generating element 115 with an oxidant, is equipped with at least one pump 132 for supplying an oxidant with a predetermined pumping power.

The electricity generating element 115 includes a membrane-electrode assembly 112 that oxidizes hydrogen or fuel and reduces an oxidant, and separators 114 and 114' that are respectively positioned at opposite sides of the membrane-electrode assembly and supply hydrogen or fuel, and an oxidant, respectively. At least one electricity generating element 115 constitutes a stack 110.

The following examples illustrate the present invention in more detail. However, it is understood that the present invention is not limited by these examples.

EXAMPLE 1

125 μm of a commercially available NAFION 115 membrane was respectively treated with 3% hydrogen peroxide at 100° C. and 0.5M of a NaOH aqueous solution for one hour, and was thereafter washed with deionized water at 100° C. for one hour to prepare a sodium-type polymer electrolyte membrane.

Then, Ce was sputtered at 20° C. and attached to one side of the polymer electrolyte membrane. Then, Au as a first metal catalyst was grown on the Ce through ion sputtering. Next, a slurry including a Pt—Ru alloy as a second metal catalyst was prepared, and was thereafter coated on the first catalyst layer with a spraying method to form a second metal catalyst layer. The other side of the polymer electrolyte membrane was treated the same way to form first and second catalyst layers. Accordingly, the polymer electrolyte membrane had cathode and anode catalyst layers at respective sides.

Then, a commercially-available electrode substrate (SGL Carbon 31BC) was physically adhered to both sides of the polymer electrolyte membrane having catalyst layers. The prepared membrane-electrode assembly was interposed between two sheets of gaskets and then between two separators with a predetermined-shaped gas channel and cooling channel, and was finally compressed together between copper end plates, fabricating a single cell.

EXAMPLE 2

A single cell was fabricated by the same method as in Example 1, except that the catalyst layer was formed only on an anode side of a polymer electrolyte membrane.

EXAMPLE 3

A single cell was fabricated by the same method as in Example 1, except that W was used as the first metal catalyst, and Pt/Ru supported on graphite was used as the second metal catalyst, and in addition, a catalyst layer including the first and second metal catalysts was formed only on the anode.

COMPARATIVE EXAMPLE 1

125 μm of a commercially-available NAFION 115 membrane was respectively treated with 3% hydrogen peroxide at 100° C. and 0.5M of a NaOH aqueous solution for one hour, and was then washed with deionized water at 100° C. for one hour to prepare a sodium-type NAFION 115 membrane.

4.5 g of 10 wt % NAFION (NAFION®, Dupont Co.) water-based dispersion solution was added to 3.0 g of Pt black (Hispec®1000, Johnson Matthey Co.) and Pt/Ru black (Hispec® 6000, Johnson Matthey Co.) catalysts in a drop-wise fashion. The mixture was mechanically agitated to prepare a composition for forming a catalyst layer.

The composition for forming a catalyst layer was directly coated on one side of the polymer electrolyte membrane through screen printing. The catalyst layer was formed with an area of 5×5 cm$^2$ and respectively loaded at 3 mg/cm$^2$. The other side of the polymer electrolyte membrane was treated the same way to respectively form cathode and anode catalyst layers on respective sides thereof.

Then, a commercially-available electrode substrate (SGL Carbon 31BC) was physically adhered to both sides of the polymer electrolyte membrane having the catalyst layers. The membrane-electrode assembly was interposed between two sheets of gaskets and then between two separators with a gas channel and a cooling channel, and was finally compressed together between copper end plates, fabricating a single cell.

After the first metal catalyst was grown on a polymer electrolyte membrane in Example 1, it was examined regarding its cross-section through a scanning electron microscope. The results are provided in FIG. 3.

Figure 3:
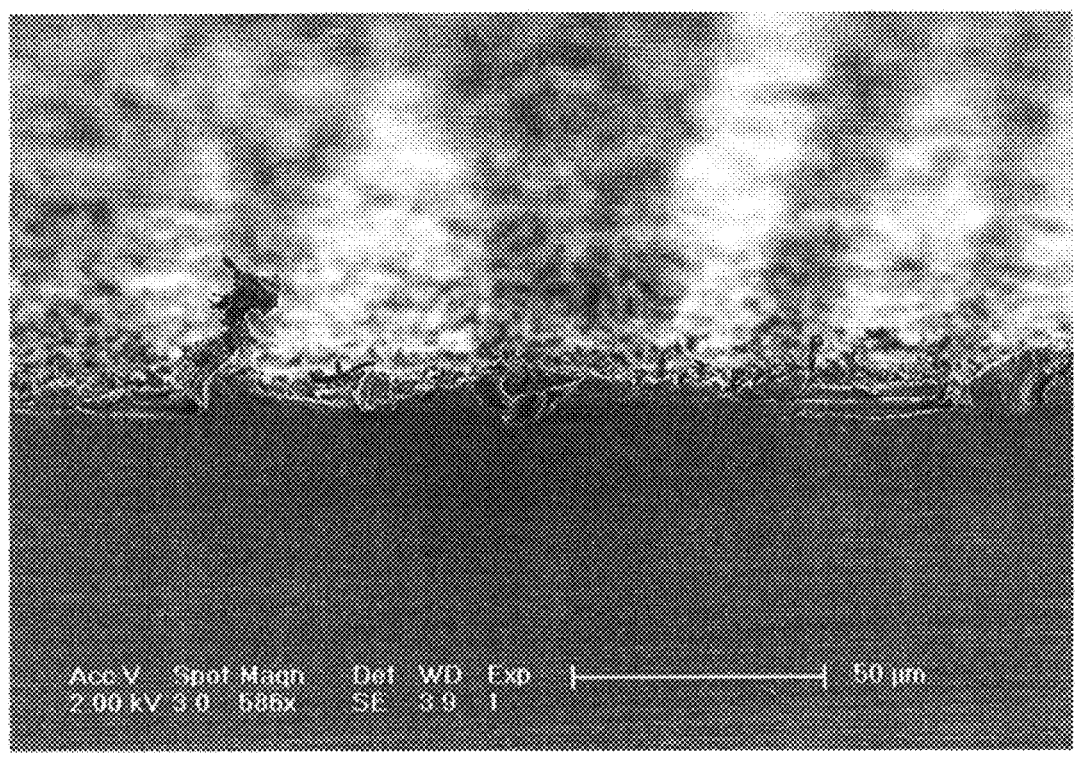
FIG. 3 is a cross-sectional view showing the first catalyst layer grown on a polymer electrolyte membrane in a nano-nodule shape in the membrane-electrode assembly according to Example 1.

As shown in FIG. 3, a first metal catalyst, Au, was identified to grow on a polymer electrolyte membrane in a nano-nodule shape in an ion sputtering method.

As for a single cell according to Examples 1 and 2 and Comparative Example 1, methanol was inserted into a cathode catalyst layer and air into an anode catalyst layer, and then their output change was measured, depending on temperature of the cell and methanol concentration. The results are provided in the following Table 1.

TABLE 1

| | Power density at 60° C. (mW/cm$^2$ at 0.4 V) |
|---|---|
| Example 1 | 100 |
| Example 2 | 120 |
| Comparative Example 1 | 80 |

As shown in Table 1, a single cell of Examples 1 and 2, which includes a nano-nodule metal catalyst, turned out to have much better output density than that of Comparative Example 1. The single cell of Example 1 includes a nano-nodule catalyst grown on a polymer electrolyte membrane, and could thereby have increased catalyst activity. In addition, since micropores were formed inside a catalyst layer, a material and an ion can easily transfer toward the polymer electrolyte membrane.

Therefore, a membrane-electrode assembly of the embodiments of the present invention can have increased interactions between a polymer electrolyte membrane and a catalyst, and also micropores inside a catalyst layer, and thereby make mass easily transferred toward the polymer electrolyte membrane. Accordingly, a fuel cell including the membrane-electrode assembly of the present invention can have excellent fuel cell performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly for a fuel cell, comprising:
   a polymer electrolyte membrane; and
   a first electrode and a second electrode formed on both sides of the polymer electrolyte membrane and facing each other, at least one of the first electrode and the second electrode comprising:
   an electrode substrate; and
   a catalyst layer comprising
      a first metal catalyst layer consisting of a metal selected from the group consisting of Pt, Ru, Au, W, Pd, Fe, and alloys thereof and directly grown on the polymer electrolyte membrane toward the electrode substrate with a shape of a nano-nodule; and
      a second catalyst layer including a second metal catalyst covering the first metal catalyst layer.

2. The membrane-electrode assembly of claim 1, wherein the first metal catalyst layer has an average height ranging from 50 nm to 5 μm measured from the polymer electrolyte membrane.

3. The membrane-electrode assembly of claim 1, wherein the weight of the first metal catalyst is not greater than 98 percent by weight based on the total weight of the first metal catalyst and the second metal catalyst.

4. The membrane-electrode assembly of claim 1, wherein a thickness ratio of the first metal catalyst layer and the second catalyst layer ranges from 1/2500:1 to 1/25:1.

5. The membrane-electrode assembly of claim 1, wherein the catalyst layer has a micropore.

6. The membrane-electrode assembly of claim 1, wherein the second metal catalyst comprises at least one selected from the group consisting of platinum, ruthenium, osmium, a platinum-ruthenium alloy, a platinum-osmium alloy, a platinum-palladium alloy, a platinum-M alloy, and combinations thereof, where M is transition elements selected from the group consisting of Ga, Ti, V, Cr, Mn, Fe, Co, Ni, Cu, Zn, Sn, Mo, W, Rh, Ru, and combinations thereof.

7. The membrane-electrode assembly of claim 1, wherein the catalyst layer further comprises a support which is formed on the polymer electrolyte membrane and on which the first metal catalyst layer is grown, and the support is selected from the group consisting of Ce, Ni, Mn, Fe, Co, Zr, zirconia, polyoxometalate, heteropoly acid (HPA), and combinations thereof.

8. The membrane-electrode assembly of claim 1, wherein either the first electrode or the second electrode is an anode.

9. The membrane-electrode assembly of claim 1, wherein at least one of the first electrode and the second electrode comprises a microporous layer formed between the electrode substrate and the catalyst layer.

10. A fuel cell system comprising:
    an electricity generating element comprising:
    a membrane-electrode assembly comprising:
    a polymer electrolyte membrane; and
    an anode and a cathode formed on both sides of the polymer electrolyte membrane and facing each other, at least one of the anode and the cathode comprising:
    an electrode substrate; and
    a catalyst layer comprising
       a first metal catalyst layer consisting of a metal selected from the group consisting of Pt, Ru, Au, W, Pd, Fe, and alloys thereof and directly grown on the polymer electrolyte membrane toward the electrode substrate with a shape of a nano-nodule; and
       a second catalyst layer including a second metal catalyst covering the first metal catalyst layer; and
    a separator positioned at each side of the membrane-electrode assembly;
    a fuel supplier supplying the electricity generating element with fuel; and
    an oxidant supplier supplying the electricity generating element with an oxidant.

11. The fuel cell system of claim 10, wherein the catalyst layer has a micropore.

12. The fuel cell system of claim 10, wherein the first metal catalyst layer has an average height ranging measured from 50 nm to 5 μm measured from the polymer electrolyte membrane, and a thickness ratio of the first metal catalyst layer and the second catalyst layer ranges from 1/2500:1 to 1/25:1.

13. The fuel cell system of claim 10, wherein the second metal catalyst comprises at least one selected from the group consisting of platinum, ruthenium, osmium, a platinum-ruthenium alloy, a platinum-osmium alloy, a platinum-palladium alloy, a platinum-M alloy, and combinations thereof, where M is transition elements selected from the group consisting of Ga, Ti, V, Cr, Mn, Fe, Co, Ni, Cu, Zn, Sn, Mo, W, Rh, Ru, and combinations thereof.

14. The fuel cell system of claim 10, wherein the catalyst layer further comprises a support which is formed on the polymer electrolyte membrane and on which the first metal catalyst layer is grown, and the support is selected from the group consisting of Ce, Ni, Mn, Fe, Co, Zr, zirconia, polyoxometalate, heteropoly acid (HPA), and combinations thereof.

15. The fuel cell system of claim 10, wherein the catalyst layer is an anode catalyst layer.

16. A membrane-electrode assembly for a fuel cell, comprising:
    a polymer electrolyte membrane; and
    a first electrode and a second electrode formed on both sides of the polymer electrolyte membrane and facing each other, at least one of the first electrode and the second electrode comprising:
    an electrode substrate; and
    a catalyst layer comprising a first catalyst layer including a first metal catalyst layer directly grown on the polymer electrolyte membrane toward the electrode substrate with a shape selected from the group consisting of a nanohorn, a nanorod, a nanofiber, and combinations thereof and a second catalyst layer including a second catalyst covering the first catalyst layer.

17. A fuel cell system comprising:
    an electricity generating element comprising:
    a membrane-electrode assembly comprising:
    a polymer electrolyte membrane; and
    an anode and a cathode formed on both sides of the polymer electrolyte membrane and facing each other, at least one of the anode and the cathode comprising:
    an electrode substrate; and
    a catalyst layer comprising a first catalyst layer including a first metal catalyst layer directly grown on the polymer electrolyte membrane toward the electrode substrate with a shape selected from the group consisting of a nanohorn, a nanorod, a nanofiber, and combinations thereof and a second catalyst layer including a second catalyst covering the first catalyst layer; and
    a separator positioned at each side of the membrane-electrode assembly;
    a fuel supplier supplying the electricity generating element with fuel; and
    an oxidant supplier supplying the electricity generating element with an oxidant.

* * * * *